(12) United States Patent
Shibata et al.

(10) Patent No.: US 6,799,888 B2
(45) Date of Patent: Oct. 5, 2004

(54) METHOD FOR PREDICTING TEMPERATURE, TEST WAFER FOR USE IN TEMPERATURE PREDICTION, AND METHOD FOR EVALUATING LAMP HEATING SYSTEM

(75) Inventors: Satoshi Shibata, Toyama (JP); Yuko Nambu, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/600,596

(22) Filed: Jun. 23, 2003

(65) Prior Publication Data

US 2004/0109489 A1 Jun. 10, 2004

Related U.S. Application Data

(63) Continuation of application No. 09/984,908, filed on Oct. 31, 2001, now Pat. No. 6,666,577.

(30) Foreign Application Priority Data

Nov. 2, 2000 (JP) ........................................ 2000-335501

(51) Int. Cl.[7] ........................... G01K 1/02; G01K 13/00; G01K 15/00; G01K 25/00

(52) U.S. Cl. ........................ 374/159; 374/161; 374/141; 374/1; 374/7; 374/137; 219/497; 117/8; 438/14; 438/16; 392/416

(58) Field of Search ............................... 374/141, 1, 7, 374/137, 102, 101, 6, 9, 45, 57, 159, 161, 149; 438/14, 16, 17, 18, 54, 7; 117/8, 10, 201; 118/724, 725; 219/497, 502; 392/416; 257/467, E21.53

(56) References Cited

U.S. PATENT DOCUMENTS 4,786,608 A    11/1988   Griffith
5,265,957 A    11/1993   Moslehi et al.

(List continued on next page.)

FOREIGN PATENT DOCUMENTS

| JP | 03079057 A | * | 4/1991 | ........... H01L/21/66 |
|---|---|---|---|---|
| JP | 07248264 A | * | 9/1995 | ............ G01K/7/16 |
| JP | 07294569 A | * | 11/1995 | ........... G01R/27/02 |
| JP | 09320988 A | * | 12/1997 | ........... H01L/21/28 |
| JP | 11160166 A | * | 6/1999 | .......... G01K/15/00 |
| JP | 2000232142 A | * | 8/2000 | ........... H01L/21/66 |
| WO | WO 98/57146 A1 | | 12/1998 | |

OTHER PUBLICATIONS

Abstracted–Pub–No: JP 11160166A, Derwent–Acc–No: 1999–408057, Derwent–Week:200335 (2003).*

(List continued on next page.)

*Primary Examiner*—Edward Lefkowitz
*Assistant Examiner*—Stanley J. Pruchnic, Jr.
(74) *Attorney, Agent, or Firm*—Nixon Peabody LLP; Donald R. Studebaker

(57) ABSTRACT

A test wafer for use in wafer temperature prediction is prepared. The test wafer includes: first semiconductor layer formed in a crystalline state; second semiconductor layer formed in an amorphous state on the first semiconductor layer; and light absorption film formed over the second semiconductor layer. Next, the test wafer is loaded into a lamp heating system and then irradiating the test wafer with a light emitted from the lamp, thereby heating the second semiconductor layer through the light absorption film. Thereafter, a recovery rate, at which a part of the second semiconductor layer recovers from the amorphous state to the crystalline state at the interface with the first semiconductor layer, is calculated. Then, a temperature of the test wafer that has been irradiated with the light is measured according to a relationship between the recovery rate and a temperature corresponding to the recovery rate.

6 Claims, 13 Drawing Sheets

U.S. PATENT DOCUMENTS

| | | | |
|---|---|---|---|
| 5,769,540 A | | 6/1998 | Schietinger et al. |
| 5,902,504 A | | 5/1999 | Merchant et al. |
| 5,994,676 A | | 11/1999 | Dutartre |
| 6,022,749 A | | 2/2000 | Davis et al. |
| 6,114,765 A | * | 9/2000 | Fujii et al. .................. 257/757 |
| 6,126,744 A | | 10/2000 | Hawkins et al. |
| 6,128,084 A | | 10/2000 | Nanbu et al. |
| 6,132,081 A | | 10/2000 | Han |
| 6,200,023 B1 | | 3/2001 | Tay et al. |
| 6,299,346 B1 | | 10/2001 | Ish-Shalom et al. |
| 6,472,232 B1 | | 10/2002 | Johnson et al. |
| 6,475,815 B1 | | 11/2002 | Nambu et al. |
| 6,580,140 B1 | * | 6/2003 | Ballantine et al. .......... 257/467 |
| 6,616,331 B2 | * | 9/2003 | Shibata et al. ............... 374/141 |
| 6,638,629 B2 | * | 10/2003 | Johnson et al. ............. 428/446 |
| 6,666,577 B2 | * | 12/2003 | Shibata et al. ............... 374/141 |

OTHER PUBLICATIONS

Partial English Translation of Laid Open Unexamined Application Publ. No. JP 11160166A, Patent Abstracts of Japan (1999).*

Abstracted–Pub–No: JP 2000232142 A, Derwent–Acc–No:2001–083756, Derwent–Week:200370 (2003).*

Patent Abstracts of Japan, JP 09320988 A, "Semiconductor Device and its Manufacture," (Dec. 12, 1997).*

Partial English Translation of Laid Open Unexamined Application Publ. No. JP 09320988 A. Patent Abstracts of Japan (1997).*

Abstracted–Pub–No: JP 07294569A, Derwent–Acc–No: 1996–023804, Derwent–Week: 199603 (1996).*

Patent Abstracts of Japan, JP 03079057A, (Apr. 1991).*

Patent Abstracts of Japan, JP 07248264 A, "Temperature Measuring Method Using Ion Implanted Wafer," (Sep. 26, 1995).*

Notice of Reasons of Rejection, JPO Patent Application No. 2001–296288 for patent, English Translation (3 pages) Dec. 2, 2003.*

Fried, M., et al., "Optical properties of thermally stabilized ion implantation amorphized silicon," Nuclear Instruments and Methods in Physics Research, B19/20, North–Holland, Amsterdam (1987) 577–581.

Csepregi, L., et al., "Reordering of amorphous layers of Si implanted with 3IP and 75As, and 11B ions," Journal of Applied Physics (Oct. 1977) vol. 48, No. 10, pp. 4234–4240.

* cited by examiner

METHOD FOR PREDICTING TEMPERATURE, TEST WAFER FOR USE IN TEMPERATURE PREDICTION, AND METHOD FOR EVALUATING LAMP HEATING SYSTEM

This application is a continuation of U.S. Ser. No. 09/984,908 filed Oct. 31, 2001, now U.S. Pat. No. 6,666,577.

BACKGROUND OF THE INVENTION

The present invention relates to a method for predicting temperature, a test wafer for use in temperature prediction, and a method for evaluating a lamp heating system using the test wafer. More particularly, this invention provides measures to predict more accurately the actual temperature or temperature distribution of a wafer to be loaded into the lamp heating system.

A method for predicting the actual temperature of a wafer to be loaded into a thermal system, in which the wafer should be subjected to intense heat in a semiconductor device fabrication process, was disclosed in PCT International Publication No. WO 98/57146.

In the Publication, an amorphous layer is formed in the uppermost part of a silicon wafer by implanting ions. Then, the silicon wafer including the amorphous layer is loaded into a thermal processing system and heated therein. In this manner, the actual temperature of the silicon wafer is predicted.

The present inventors carried out various experiments on the known method for predicting temperature. As a result of these experiments, it was found that the actual wafer temperature could not be predicted accurately enough by the known method when the method was applied to a lamp heating system as described later.

SUMMARY OF THE INVENTION

It is therefore a first object of the present invention to predict accurately the actual temperature or temperature distribution of a wafer to be loaded into a lamp heating system.

It is a second object to evaluate whether or not the lamp heating system including a lamp is affected by light emitted from the lamp and transmitted through the wafer.

In order to achieve the first object, according to the present invention, a method is used for predicting, using a test wafer, a temperature of a wafer to be loaded into a lamp heating system including a lamp. The method includes the steps of: a) preparing the test wafer, which includes a first semiconductor layer formed in a crystalline state, a second semiconductor layer formed in an amorphous state on the first semiconductor layer, and a light absorption film formed over the second semiconductor layer; b) loading the test wafer into the lamp heating system and then irradiating the test wafer with a light emitted from the lamp, thereby heating the second semiconductor layer through the light absorption film; c) calculating a recovery rate at which a part of the second semiconductor layer that has been heated recovers from the amorphous state to the crystalline state at the interface with the first semiconductor layer; and d) measuring a temperature of the test wafer that has been irradiated with the light, according to a relationship between the recovery rate and a temperature corresponding to the recovery rate.

According to the inventive method, a test wafer for use in temperature prediction includes a light absorption film formed over an amorphous second semiconductor layer. The light absorption film absorbs light that has been emitted from a lamp and transmitted through a first and the second semiconductor layers not to contribute a thermal process performed on the semiconductor layers. Thus, a recovery rate for obtaining the actual wafer temperature can be calculated much more accurately by the thickness of the second semiconductor layer subjected to heat. As a result, the actual temperature of the wafer loaded into a lamp heating system can be predicted accurately.

In one embodiment, at least a part of the light may have a wavelength at which the first semiconductor layer transmits the light. Then, the effects of the present invention can be obtained as intended.

In this particular embodiment, the light preferably has a wavelength at which the first semiconductor layer has a transmittance to the light and the transmittance increases at a temperature range. Then, the effects of the present invention can be obtained as intended.

In another embodiment, the light may have a wavelength from about 1.0 μm to about 3.0 μm, both inclusive.

In still another embodiment, the first semiconductor layer and the second semiconductor layer may be made of silicon and the light absorption film may be made of a conductive film containing a metal.

In this particular embodiment, the light absorption film is preferably made of a metal that is usable for forming a silicide and the lamp heating system is preferably used for a silicidation process. Then, the light absorption film acts as a metal film to be used for the silicidation process. Thus, wafer temperature prediction can be performed under the same conditions as in the silicidation process.

In this particular embodiment, the temperature range is preferably from about 450° C. to about 600° C., both inclusive.

In this particular embodiment, the test wafer preferably includes a barrier film that prevents the second semiconductor layer and the light absorption film from reacting together. This barrier film is preferably formed between the second semiconductor layer and the light absorption film.

In yet another embodiment, the test wafer may have a diameter of about 30.5 cm (12 inches) or more.

An inventive test wafer is used for predicting a temperature of a wafer to be loaded into a lamp heating system. The test wafer includes: a first semiconductor layer formed in a crystalline state; a second semiconductor layer formed in an amorphous state on the first semiconductor layer; and a light absorption film formed over the second semiconductor layer.

In one embodiment, the test wafer may further include a barrier film that prevents the second semiconductor layer and the light absorption film from reacting together. This barrier film may be formed between the second semiconductor layer and the light absorption film.

In another embodiment, the test wafer may have a diameter of about 30.5 cm (12 inches) or more.

In order to achieve the second object, an inventive method is used for evaluating a lamp heating system including a lamp. Specifically, this method, which utilizes a transmittance to a light emitted from the lamp, is used for evaluating whether or not respective temperatures of a first test wafer and a second test wafer loaded in the lamp heating system are affected by the light. The method includes the step of a) preparing: the first test wafer including a first semiconductor layer formed in a crystalline state and a second semiconductor layer formed in an amorphous state on the first semiconductor layer; and the second test wafer including a third semiconductor layer formed in a crystalline state, a fourth semiconductor layer formed in an amorphous state on the third semiconductor layer, and a light absorption film formed over the fourth semiconductor layer. The method also includes the step of b) loading the first test wafer and the second test wafer into the lamp heating system and then irradiating the first test wafer and the second test wafer with the light, thereby heating the second semiconductor layer and heating the fourth semiconductor layer through the light absorption film. The method further includes the step of c) obtaining a first rate of variation in thickness of the second semiconductor layer with respect to a period of time in which the second semiconductor layer is subjected to heat, and obtaining a second rate of variation in thickness of the fourth semiconductor layer with respect to a period of time in which the fourth semiconductor layer is subjected to heat. The method further includes the step of d) comparing the first rate with the second rate, thereby judging that the temperature of the first test wafer is not easily affected by the light transmitted through the first test wafer if the first rate is equal to the second rate, while judging that the temperature of the first test wafer is easily affected by the light transmitted through the first test wafer if the first rate is smaller than the second rate.

According to an inventive method for evaluating a lamp heating system, variation in thickness of a second semiconductor layer (amorphous layer) in a first test wafer including no light absorption film and that of a fourth semiconductor layer (amorphous layer) in a second test wafer including a light absorption film are compared with each other. Then, whether or not the lamp heating system is easily affected by light emitted from the lamp and transmitted through the semiconductor layers.

In this case, the system that is easily affected by the light is a system in which the first test wafer transmits a relatively large amount of the light and thus has its real temperature differ greatly from a temperature indicated by a thermometer made up of, for example, a thermocouple provided in the system.

BRIEF DESCRIPTION OF THE DRAWINGS

FIG. 2A illustrates the structure of a lamp heating system and FIG. 2B illustrates the structure of a heater heating system.

FIG. 12A is a graph for a heating system that is affected by the structure of the wafer. FIG. 12B is a graph for a heating system that is not affected by the structure of the wafer.

DETAILED DESCRIPTION

Hereinafter, the temperature predicting method using a known test wafer, disclosed in PCT International Publication No. WO 98/57146, will be described. The known test wafer includes a first semiconductor layer formed in a crystalline state and a second semiconductor layer formed in an amorphous state on the first semiconductor layer.

First, the second semiconductor layer of the test wafer is measured beforehand with a spectroscopic ellipsometer. At this time, the second semiconductor layer is supposed to have a thickness t0. Then, the test wafer is loaded into a thermal system, e.g., a thermal processing system, and subjected to heat for a period of time a (s). After being subjected to heat, the second semiconductor layer is supposed to have a thickness t1. Then, the thickness t1 is measured with a spectroscopic ellipsometer. In this case, the second semiconductor layer in the amorphous state has its thickness decreased from t0 to t1. This is because crystals start to grow epitaxially from the interface between the first and second semiconductor layers, thereby crystallizing the lowermost part of the second semiconductor layer.

Next, using the initial thickness t0 and the thickness t1 of the second semiconductor layer, the decrease in thickness of the second semiconductor layer per unit time, i.e., the rate R at which that part of the second semiconductor layer recovers from the amorphous state to crystalline state, is calculated by $$R=|t1-t0|/a$$

where $0 \leq t1 \leq t0$.

Figure 13:
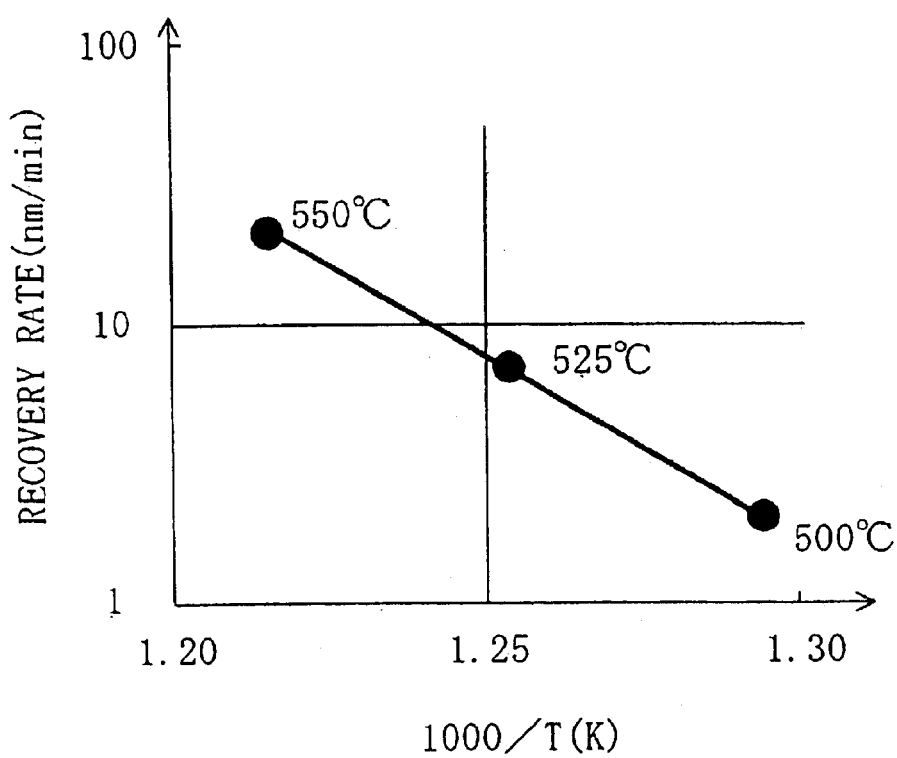
FIG. 13 is a graph showing a relationship between a recovery rate of an amorphous layer and a temperature.

If the recovery rate R given by this equation is applied to the graph shown in FIG. 13, the actual temperature of a silicon wafer 101 to be processed can be predicted. The graph shown in FIG. 13 illustrates a relationship between the recovery rate R and the temperature T and was drawn after J. Appl. Phys. Vol. 48, No. 10 (1997), p. 4234. It should be noted that the amorphous second semiconductor layer may be formed by implanting arsenic (As) ions into the wafer 101.

Figure 1:
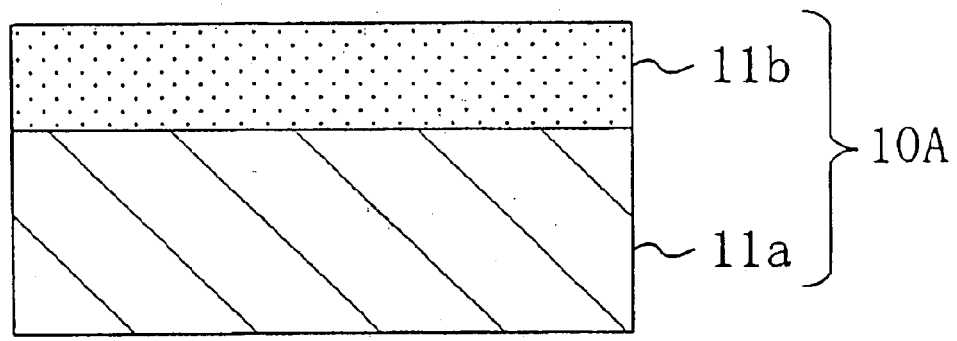
FIG. 1 is a cross-sectional view illustrating the structure of a known test wafer for use in temperature prediction.
Figure 2A:
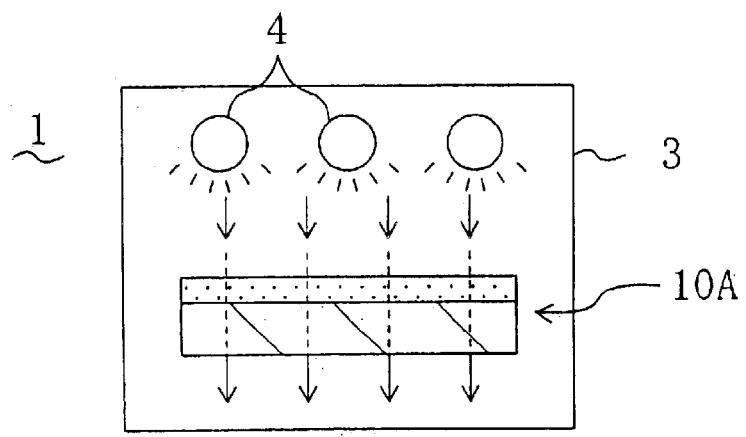
FIGS. 2A and 2B are cross-sectional views schematically showing wafer temperature prediction using the known test wafer.
Figure 2B:
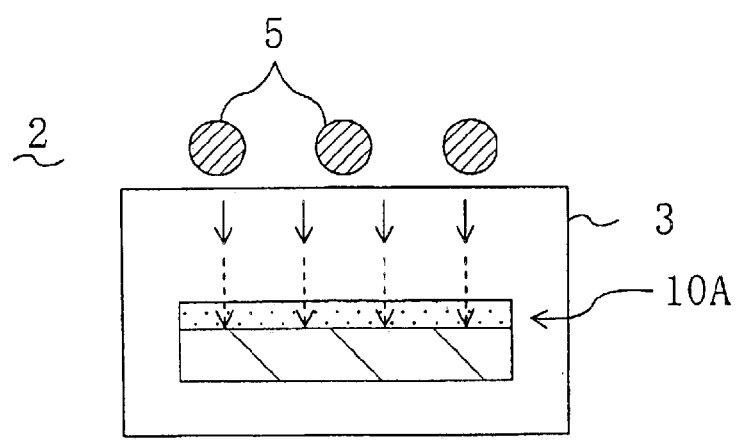

The present inventors carried out an experiment of measuring the actual wafer temperatures, using a known test wafer 10A shown in FIG. 1, in a lamp heating system 1 as shown in FIG. 2A and a heater heating system 2 as shown in FIG. 2B.

As shown in FIG. 1, the test wafer 10A includes a first semiconductor layer 11a of crystalline silicon and a second semiconductor layer 11b of amorphous silicon formed on the first semiconductor layer 11a.

As shown in FIG. 2A, the lamp heating system 1 includes halogen lamps 4, which have been provided on the ceiling of a chamber 3 and emit light having a wavelength of 1 μm or more. On the other hand, the heater heating system 2 includes a heater 5 over a chamber 3. Although not shown, after the test wafer 10A has been loaded into each of the heating systems 1 and 2, a thermocouple is placed so as to be in contact with the bottom of the test wafer 10A.

Figure 3:
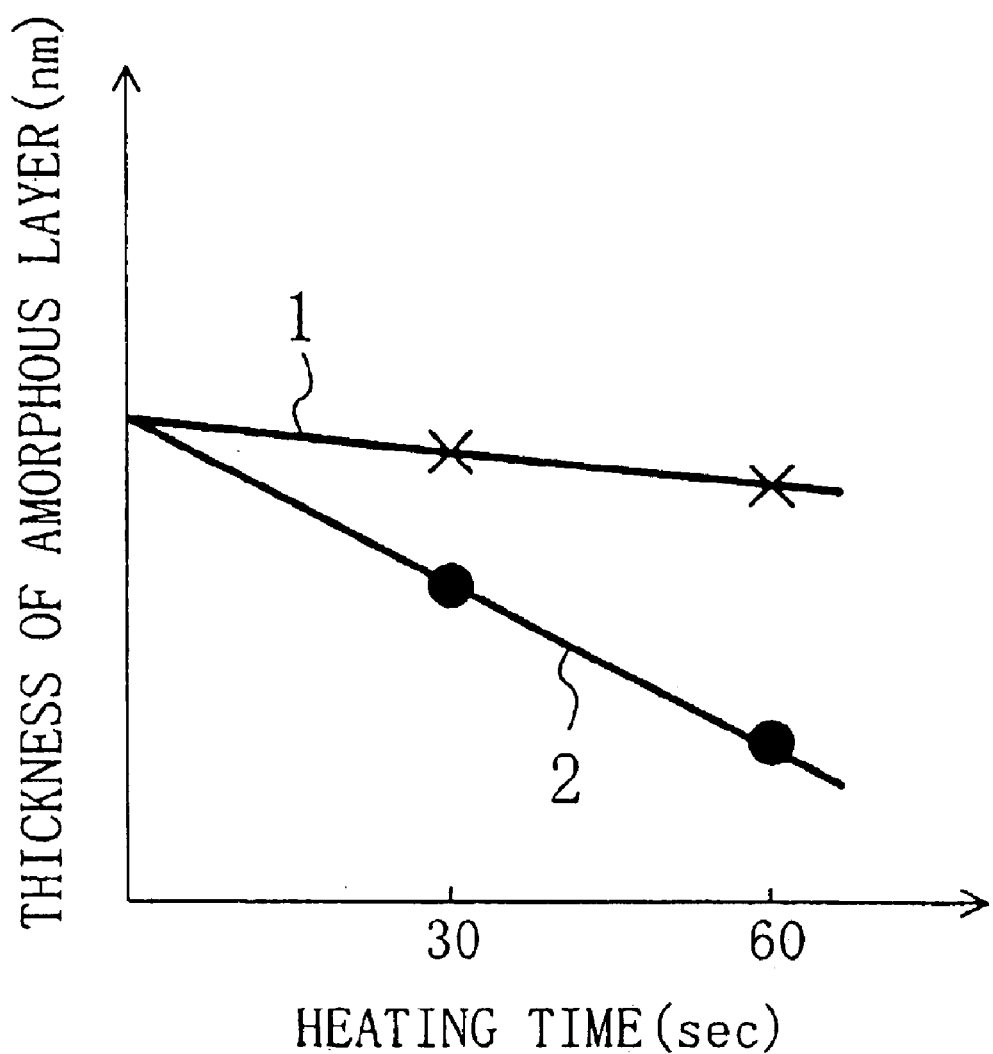
FIG. 3 shows a result of the prediction shown in FIGS. 2A and 2B, and is a graph showing relationships between the heating time of the test wafer and the thickness of a second semiconductor layer (an amorphous layer).

FIG. 3 shows relationships between the heating time of the test wafer 10A and the thickness of the second semiconductor layer (i.e., an amorphous layer) 11b. In FIG. 3, the ordinate represents the thickness of the amorphous layer, while the abscissa represents the heating time of the wafer. In this case, the test wafer 10A loaded into each of the heating systems 1 and 2 is heated twice at a temperature of 550° C. for 30 seconds and 60 seconds, respectively. Then, the thickness of the second semiconductor layer (amorphous layer) 11b is measured. The temperature of the test wafer 10A is measured using the thermocouple placed in each of the heating systems 1 and 2.

As shown in FIG. 3, if the decreases in thickness of the amorphous layers loaded into the lamp and heater heating systems 1 and 2 are compared with each other, the rate of decrease with respect to the heating time (i.e., the recovery rate) of the amorphous layer formed with the lamp heating system 1 is smaller than that formed with the heater heating system 2.

From these recovery rates and the graph shown in FIG. 13, it was found that the thermocouple provided in the heater heating system 2 indicates the real temperature of the wafer 10A, while the thermocouple provided in the lamp heating system 1 does not indicate the real temperature of the wafer 10A.

The present inventors carried out various experiments to know why the decreases in thickness of the second semiconductor layers 11b differ greatly between the systems used for heating the test wafer 10A. As a result of these experiments, the following conclusion was drawn.

Figure 4:
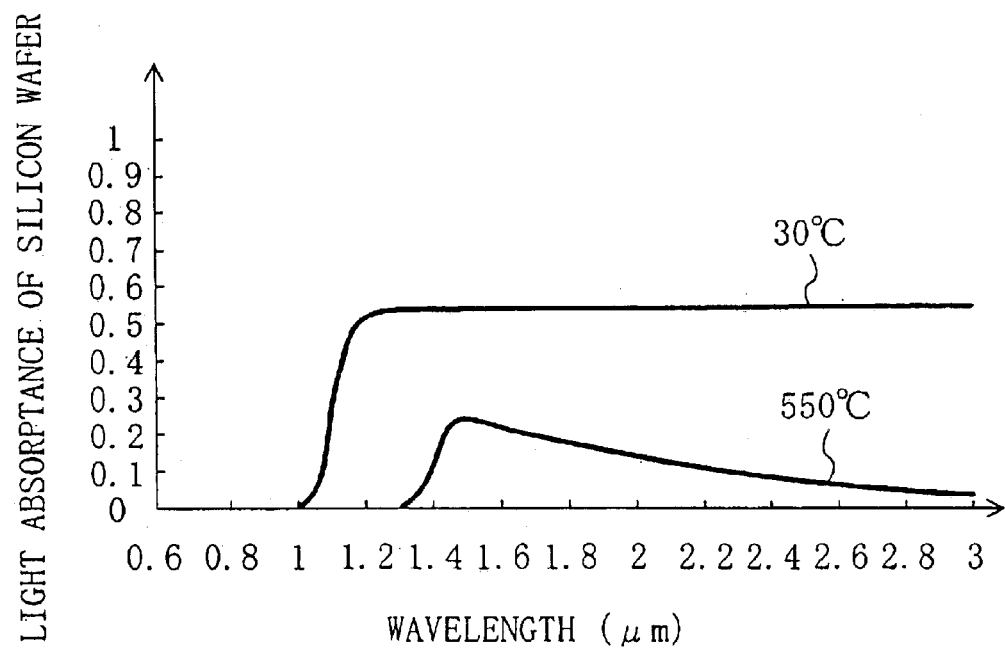
FIG. 4 is a graph showing variations of light absorption of a silicon wafer depending on the wavelength and temperatures.

Specifically, as shown in FIG. 4, the silicon test wafer 10A has its absorptance with respect to light emitted from the lamps decreased at a temperature (i.e., the real temperature) of about 450–600° C. in a wavelength range from 1 μm to 3 μm. In other words, the test wafer 10A has its transmittance to light emitted from the lamps increased. Thus, even when the temperature indicated by the thermocouple increases due to the emission of light, the real temperature of the test wafer 10A does not reach the temperature indicated by the thermocouple. As a result, the real temperature of the test wafer 10A obtained by using the recovery rate is erroneous as compared with the temperature indicated by the thermocouple provided in the lamp heating system 1.

As described above, the present inventors found that the actual wafer temperature in a lamp heating system 1 cannot be accurately predicted by using a test wafer 10A, including a second semiconductor layer 11b of amorphous silicon formed on the first semiconductor layer 11a, with a temperature to be predicted set in a range from about 450° C. to about 600° C.

Based on this finding, a test wafer including a light absorption film formed in the uppermost part of the test wafer was invented for absorbing light emitted from the lamps.

Moreover, whether or not the actual wafer temperature in a lamp heating system is affected by light emitted from the lamps can be evaluated by comparing a decrease rate of an amorphous layer in a test wafer including no light absorption film with that of a test wafer including a light absorption film.

If the second semiconductor layer 11b of the test wafer 10A is formed by implanting, for example, arsenic ions, the temperature that can be predicted ranges from, for example, about 475° C. to about 575° C., depending on the conditions for the ion implantation.

Preferred Embodiment 1

Hereinafter, a first embodiment of the present invention will be described with reference to the drawings.

Figure 5:
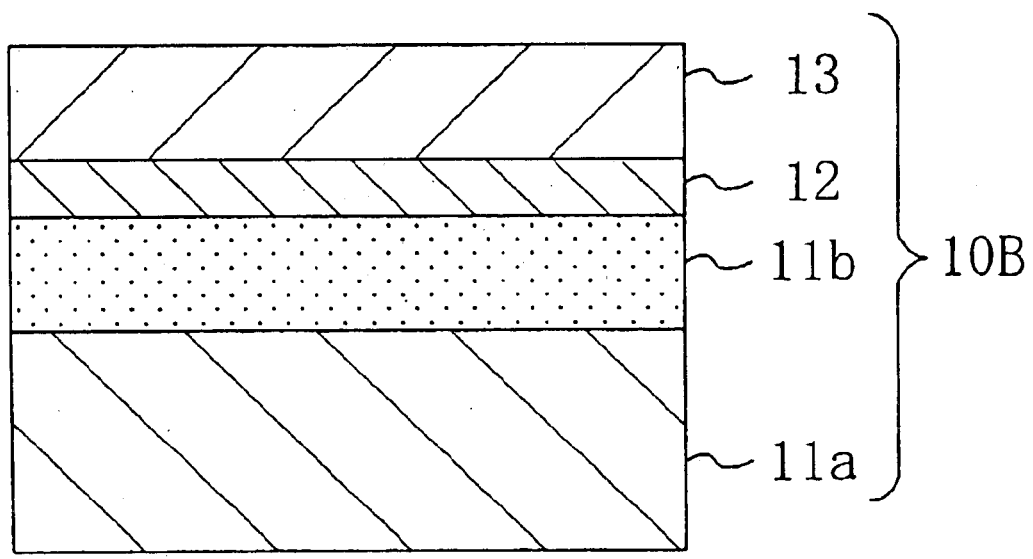
FIG. 5 is a cross-sectional view illustrating the structure of a test wafer for use in temperature prediction according to a first embodiment of the present invention.

FIG. 5 shows a cross-sectional structure of a test wafer for use in temperature prediction according to the first embodiment.

As shown in FIG. 5, a test wafer 10B according to the first embodiment is made up of: a first semiconductor layer 11a of single crystalline silicon; a second semiconductor layer 11b of amorphous silicon; a barrier film 12 of silicon dioxide; and a light absorption film 13 of titanium nitride (TiN), for example. The second semiconductor layer 11b is formed on the first semiconductor layer 11a and has a thickness of 41 nm. The barrier film 12 is formed on the second semiconductor layer 11b and has a thickness of about 3 nm. The light absorption film 13 is formed on the barrier film 12 and has a thickness of about 20 nm.

Hereinafter, process steps for forming the test wafer 10B having such a structure will be described with reference to FIGS. 6A through 6C.

Figure 6A:
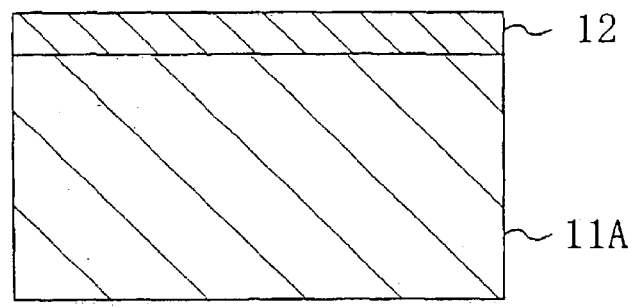
FIGS. 6A through 6C are cross-sectional views showing structures of the test wafer corresponding to respective process steps for forming the test wafer of the first embodiment.

First, as shown in FIG. 6A, a silicon wafer 11A is thermally oxidized in a dinitrogen oxide ($N_2O$) ambient, thereby forming a barrier film 12 of silicon dioxide with a thickness of about 3 nm in the uppermost part of the silicon wafer 11A.

Figure 6B:
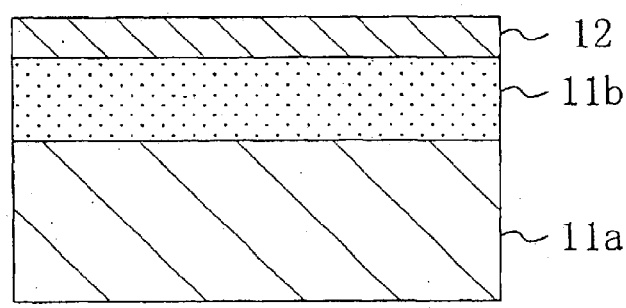

Next, as shown in FIG. 6B, arsenic ions are implanted into the silicon wafer 11A through the barrier film 12 at a dose of about $3 \times 10^{14}$ $cm^{-2}$ with an accelerating voltage of about 30 keV, thereby forming a second semiconductor layer 11b of amorphous silicon in the silicon wafer 11A. As a result, the part of the silicon wafer 11A other than the second semiconductor layer 11b now becomes a first semiconductor layer 11a of single crystalline silicon.

Figure 6C:
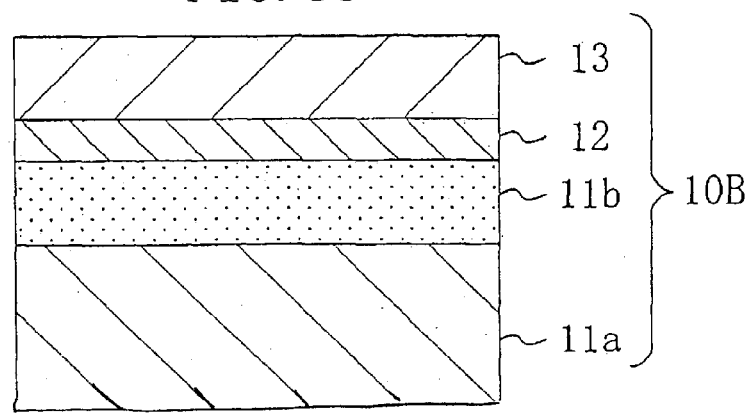

Then, as shown in FIG. 6C, a sputtering process is performed in a nitrogen ambient using a titanium target, for example, thereby depositing a light absorption film 13 of titanium nitride over the barrier film 12.

If the test wafer 10B of the first embodiment is applied to a lamp heating system, the light absorption film 13 formed in the uppermost part of the test wafer 10B absorbs light emitted from the lamps, even in a situation where the real temperature of the test wafer 10B ranges from about 450° C. to about 600° C. and a wavelength of the light ranges from about 1.0 μm to about 3.0 μm. As a result, transmittance of the test wafer 10B to the light does not change in such a situation.

As described above, some lamp heating systems include lamps that emit light with a wavelength range or a temperature range where a silicon wafer transmits a large percentage of the light. If the test wafer 10A including only the second semiconductor layer 11b of amorphous silicon in the uppermost part thereof is applied to such systems, the actual wafer temperature cannot be accurately predicted.

In contrast, if the test wafer 10B of the first embodiment is applied, the light absorption film 13 that has been formed in the uppermost part thereof and faces a light source absorbs light emitted from the lamps. As a result, the actual wafer temperature can be accurately predicted.

In the first embodiment, the light absorption film 13 is made of titanium nitride (TiN). However, the present invention is not limited to this embodiment. That is to say, even when the transmittance of the silicon wafer to light emitted from the lamps varies according to the temperature of the wafer, a material may be used so long as the material absorbs the light. For example, a metal of, e.g., cobalt (Co), nickel (Ni) or platinum (Pt) or a metal compound including such a metal may be used.

If a metal such as titanium, cobalt, nickel or platinum, which can be used for silicidation, is used for a light absorption film 13 of a test wafer 10B, temperature prediction using the test wafer 10B is preferably performed on a process where a metal film is deposited over a silicon wafer. The temperature prediction is more preferably applied to a heating system for silicidation process. This is because a temperature of the test wafer 10B can be measured in the same situation as that in an actual process.

The test wafer 10B of the first embodiment includes a barrier film 12 of silicon dioxide between the light absorption film 13 and second semiconductor layer 11$b$. The barrier film 12 does not always have to be provided. However, in a situation where the second semiconductor layer 11$b$ is silicided with the light absorption film 13, the barrier film 12 is preferably provided because the barrier film 12 will acts as a protective film that prevents the second semiconductor layer 11$b$ from being silicided.

The barrier film 12 is not necessarily made of silicon dioxide, but may be made of silicon nitride or silicon oxinitride.

The first and second semiconductor layers 11$a$ and 11$b$ of the test wafer 10B are not necessarily made of silicon, but may be made of gallium arsenide (GaAs), germanium (Ge) or indium phosphide (InP).

Hereinafter, a method for predicting the actual temperature of a wafer, using the test wafer 10B of the first embodiment will be described.

Figure 7:
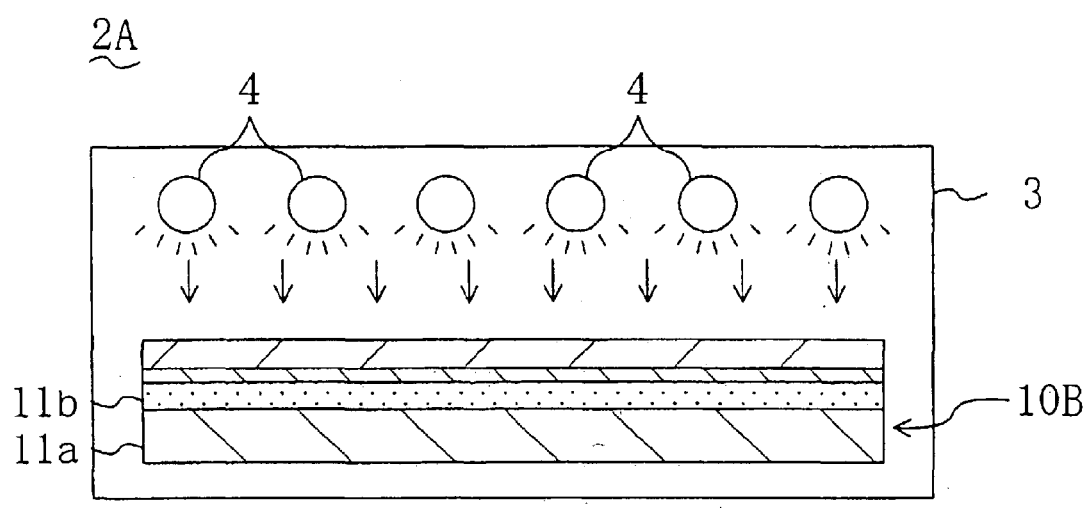
FIG. 7 is a cross-sectional view schematically showing the structure of a lamp heating system for use in wafer temperature prediction using the test wafer of the first embodiment.

First, as shown in FIG. 7, the test wafer 10B including a second semiconductor layer 11$b$ with an initial thickness to of 41 nm is loaded into a chamber 3 of a rapid thermal annealing (RTA) system 2A for heating a wafer. Halogen lamps 4 are provided on the ceiling of this chamber 3.

Next, the test wafer 10B is subjected to heat at a temperature of 550° C. for 30 seconds. At this time, the temperature indicated by a thermometer, which is made up of a thermocouple (not shown), for example, and provided in the RTA system 2A, is used for setting the temperature inside the chamber.

Figure 8A:
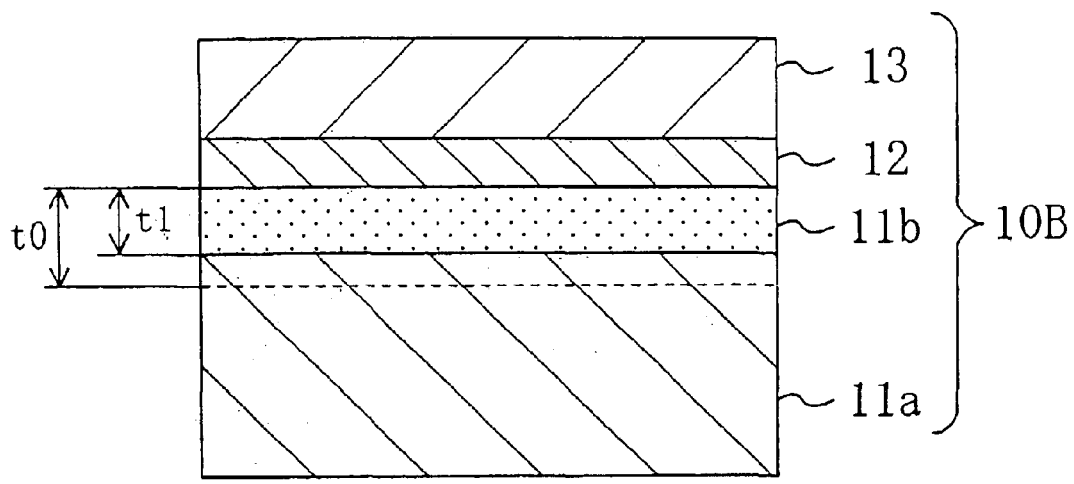
FIGS. 8A and 8B are cross-sectional views showing structures of the test wafer corresponding to respective process steps in the temperature prediction of the first embodiment.
Figure 8B:
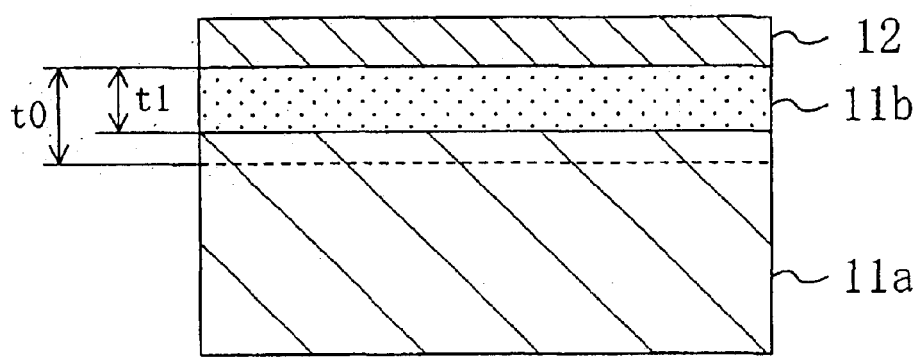

Then, as shown in FIG. 8A, the test wafer 10B is unloaded from the chamber 3. Thereafter, as shown in FIG. 8B, the light absorption film 13 of the test wafer 10B is etched away using a chlorine gas, for example. The interface between the non-processed first and second semiconductor layers 11$a$ and 11$b$ is indicated as the broken line drawn in the first semiconductor layer 11$a$ shown in FIGS. 8A and 8B.

The light absorption film 13 is removed so as to measure a thickness t1 of the processed second semiconductor layer 11$b$ with a spectroscopic ellipsometer. Subsequently, the thicknesses t1 of the processed second semiconductor layer 11$b$ are measured through the barrier film 12 with a spectroscopic ellipsometer at points all over the surface of the test wafer 10B.

Thereafter, the difference between the initial thickness t0 of the non-processed second semiconductor layer (amorphous layer) 11$b$ and the thickness t1 of the processed second semiconductor layer 11$b$ is calculated, thereby obtaining a recovery rate R per unit time by $$R=|t1-t0|/a$$

where $0 \leq t1 \leq t0$.

If the recovery rate R given by this equation is applied to the graph shown in FIG. 13, the actual temperature is predicted.

Figure 9:
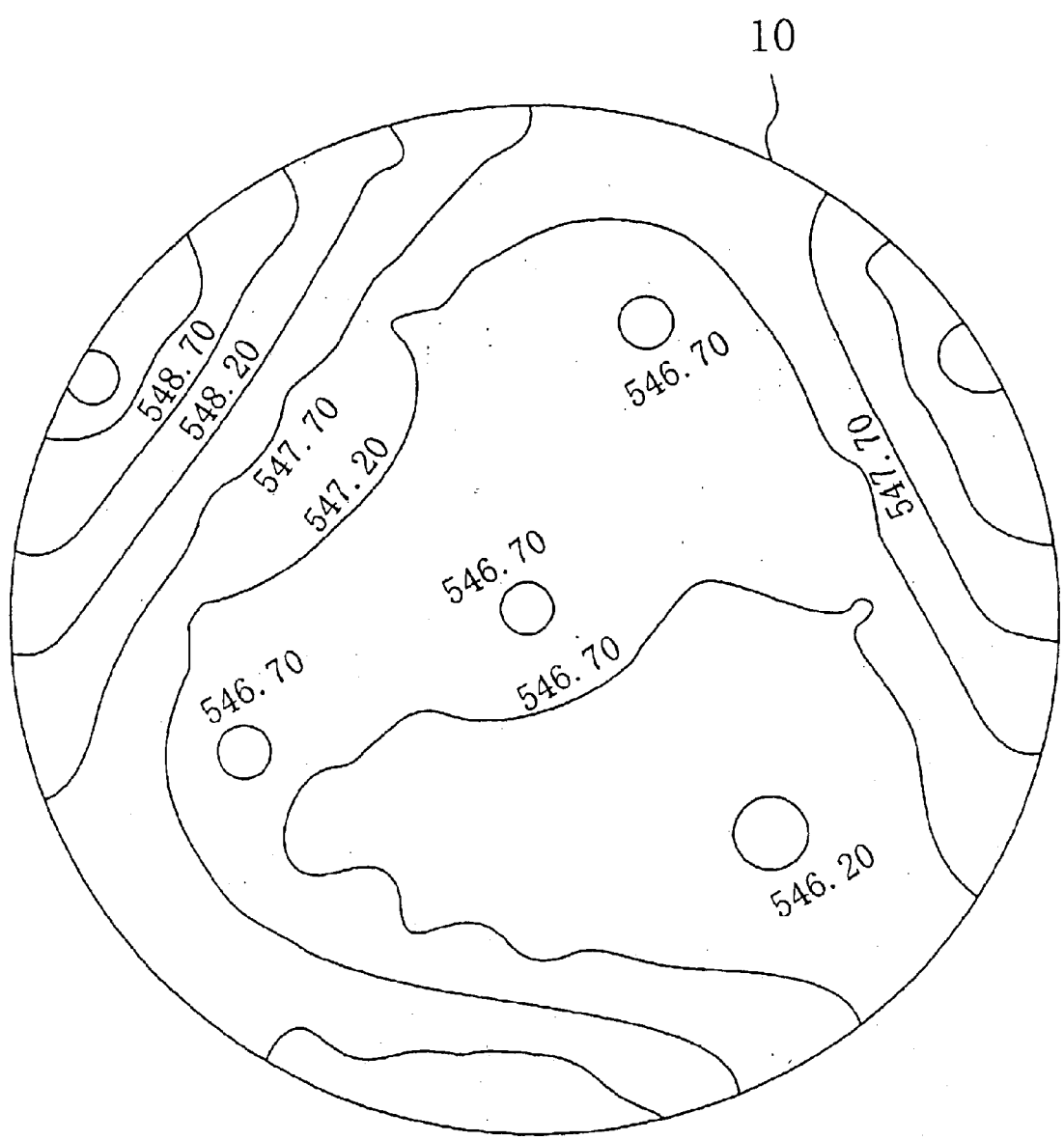
FIG. 9 is a diagram illustrating the distribution of temperatures in a wafer plane obtained by the temperature prediction of the first embodiment.

Since the test wafer 10B has the same structure as a silicon wafer to be loaded into a heating system and made into semiconductor chips, the actual temperature of the wafer to be loaded can be predicted accurately. In addition, as shown in FIG. 9, the in-wafer-plane distribution of temperatures can also be predicted more accurately at points all over the wafer, including the periphery as well as the center thereof. As a result, even for a wafer that has a diameter of 30.5 cm (12 inches) or more and thus is likely to lack in-wafer-plane uniformity of temperatures, the wafer temperature can be easily controlled as intended.

Moreover, it is also possible to detect the difference between the actual wafer temperature and a temperature that has been set using the temperature indicated by the thermometer provided in the RTA system 2A.

In this embodiment, the RTA system using halogen lamps as the light source thereof has been described. Alternatively, any other heating system with a lamp that emits light as the heat source thereof may be used. Even if the test wafer 10B of the first embodiment is applied to a system where a wafer transmits light emitted from the lamp in a temperature range, and thus having a temperature thereof lower than a temperature that has been set, the actual wafer temperature can still be accurately predicted using no thermocouple.

Preferred Embodiment 2

Hereinafter, a second embodiment of the present invention will be described with reference to the drawings.

Figure 10:
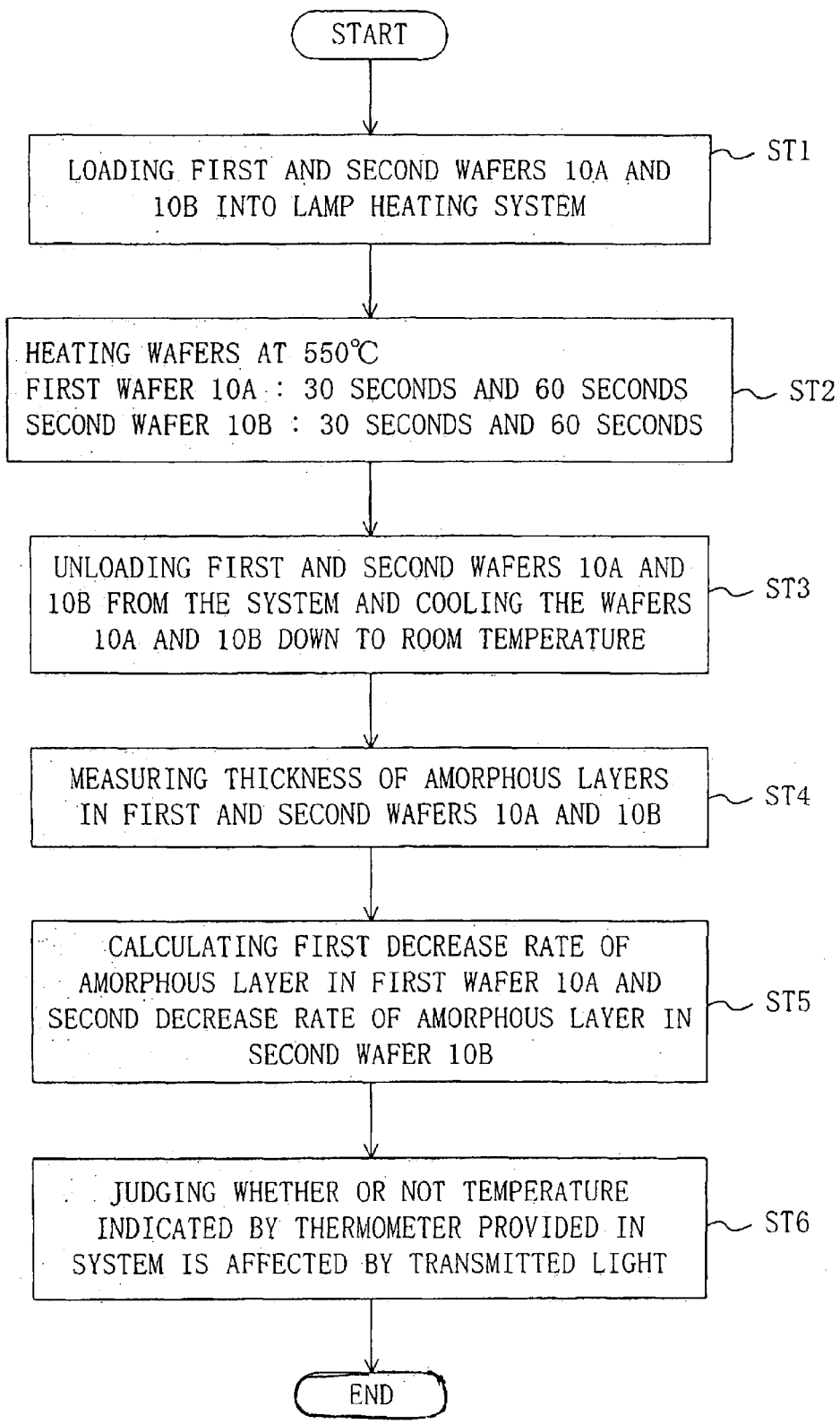
FIG. 10 is a flowchart showing the procedures of evaluating a lamp heating system in accordance with a second embodiment of the present invention.

FIG. 10 shows a flowchart illustrating the procedure for evaluating a lamp heating system in accordance with the second embodiment.

According to the second embodiment, temperature predictions are preformed under the same conditions using two types of test wafers with mutually different structures, thereby evaluating whether or not a temperature indicated by a thermometer provided in a lamp heating system is affected by a transmittance of a wafer with respect to light emitted from the lamps, i.e., by the structure of the wafer.

Specifically, if a wafer including an insulating or a conductive film and a wafer including neither insulating nor conductive film are used, it is possible to determine whether or not temperatures of the wafers indicated by thermometers provided in the lamp heating system are different from each other. The light irradiated onto the wafers is used for not only heating the wafers but also measuring temperatures of the wafers during the heat treatment.

In the second embodiment, the test wafer 10A shown in FIG. 1 having the exposed second semiconductor layer 11$b$ is used as a first wafer for the two types of the test wafers. On the other hand, the test wafer 10B shown in FIG. 5 in which the second semiconductor layer 11$b$ is covered with the barrier film 12 and light absorption film 13 is used as a second wafer for the two types of the test wafers.

Hereinafter, a method for evaluating a lamp heating system will be described in detail.

Figure 11A:
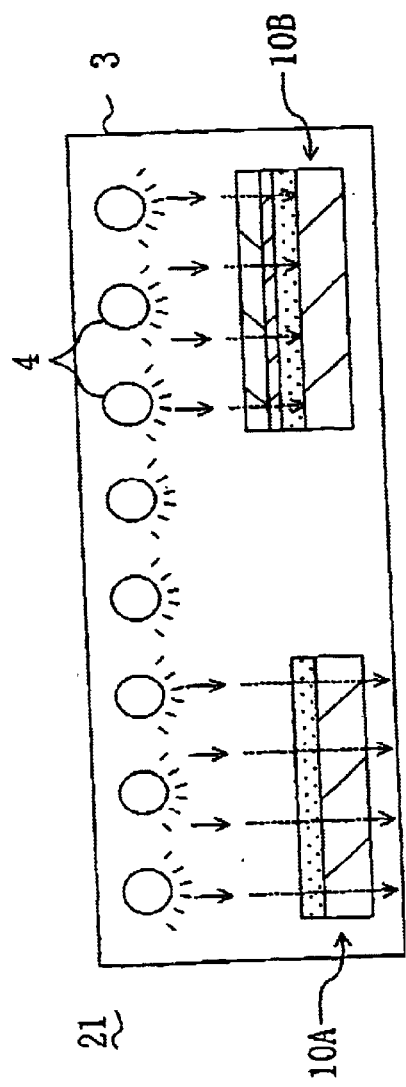
FIGS. 11A and 11B are cross-sectional view schematically showing two types of lamp heating systems for a thermal treatment in a method for evaluating the lamp heating systems accordance with the second embodiment.
Figure 11B:
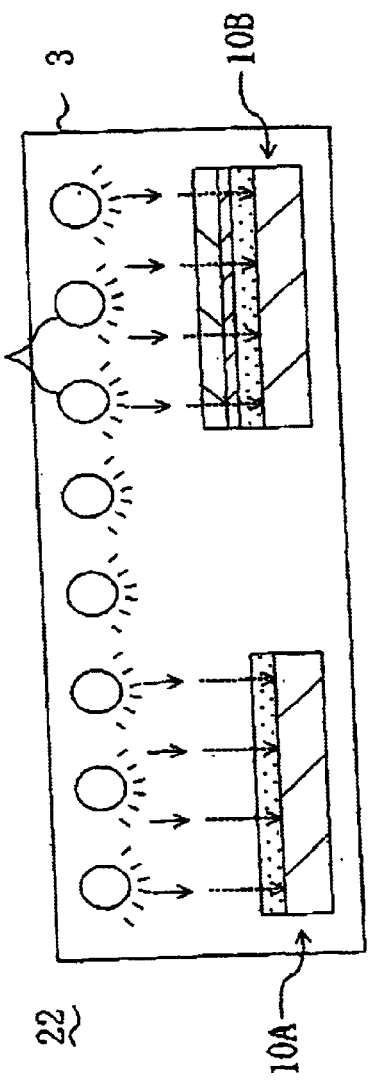

First, in the first step STP1 shown in FIG. 10, a first set of first and second wafers 10A and 10B is loaded into each chamber 3 of a first and second lamp heating system 21 or 22 as shown in FIGS. 11A and 11B. At this time, the second semiconductor layers 11b of the first and second wafers 10A and 10B for the first set are supposed to have thicknesses of 44 nm and 41 nm, respectively.

Next, in the second step ST2 shown in FIG. 10, the first set of wafers 10A and 10B loaded into the first lamp heating system 21 is heated at a temperature of 550° C. for 30 seconds. Subsequently, the first set of wafers 10A and 10B is replaced by a second set of first and second wafers 10A and 10B. Then, the second set of wafers 10A and 10B is heated at a temperature of 550° C. for 60 seconds. In the same manner, in the second lamp heating system 22, the first set of wafers 10A and 10B is heated at a temperature of 550° C. for 30 seconds, and then a second set of wafers 10A and 10B is heated at a temperature of 550° C. for 60 seconds.

Thereafter, in the third step ST3, the second set of wafers 10A and 10B is unloaded from each of the systems 21 and 22, and then the first and second sets of wafers 10A and 10B, both of which have been unloaded from the chamber, are cooled down to room temperature. Subsequently, in the fourth step ST4, the thickness of each of the second semiconductor layers (amorphous layers) 11b is measured with a spectroscopic ellipsometer. As described above, for the second wafer 10B with the light absorption film 13, after the light absorption film 13 has been removed, the thickness of the amorphous layer is measured.

Then, in the fifth step ST5, a decrease rate (a first decrease rate) of the amorphous layer in the first wafer 10A and a decrease rate (a second decrease rate) of the amorphous layer in the second wafer 10B are calculated, for example. In this case, the decrease rate is a rate of decrease in thickness of the amorphous layer per unit time.

Figure 12A:
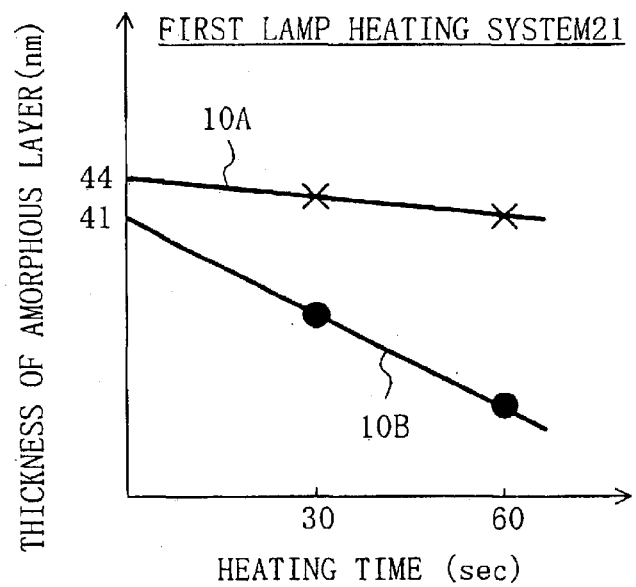
FIGS. 12A and 12B show respective rates of decrease in thickness of amorphous layers formed in test wafers for use in the evaluating method of the second embodiment.
Figure 12B:
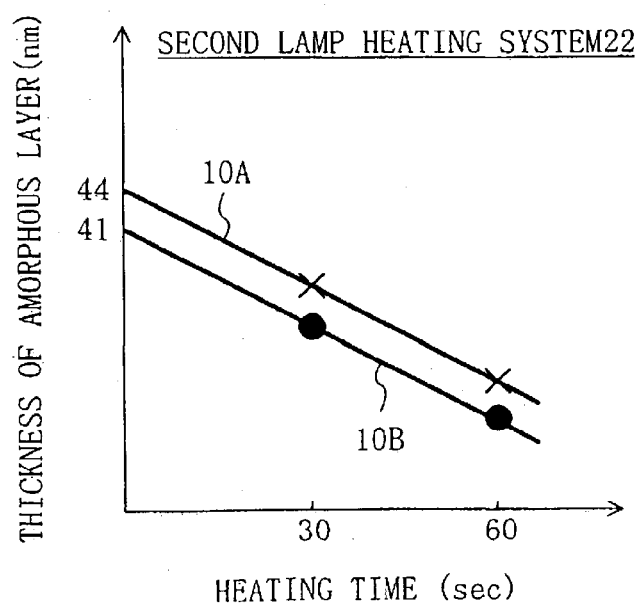

FIG. 12A shows the respective first and second decrease rates of the first and second wafers 10A and 10B that have been loaded into the first lamp heating system 21. FIG. 12B shows the respective first and second decrease rates of the first and second wafers 10A and 10B that have been loaded into the second lamp heating system 22. In the second embodiment, the variations in thickness of the amorphous layers in the first and second wafers 10A and 10B are compared with each other by using the decrease rates. However, the present invention is not limited to a specific embodiment, but may be modified so as to determine how the thicknesses t1 of the amorphous layers vary in the test wafers 10A and 10B.

Next, in the sixth step ST6, whether or not the temperatures indicated by the thermometers provided in the heating systems 21 and 22 are affected by the structures of the wafer is determined based on the data shown in FIGS. 12A and 12B.

Specifically, as shown in FIG. 12A, the first decrease rate in the first wafer 10A including no light absorption film 13 is smaller than that in the second wafer 10B including the light absorption film 13. This shows that the second semiconductor layer 11b in the first wafer 10A is not heated to the same temperature as the second semiconductor layer 11b in the second wafer 10B. In other words, the first wafer 10A in the first lamp heating system 21 unintentionally transmits at least part of the light emitted from the lamps, and hence does not have its real temperature increased to the same extent as that of the second wafer 10B. Thus, the first lamp heating system 21 is affected by the structure of a wafer.

On the other hand, as shown in FIG. 12B, the first decrease rate in the first wafer 10A is equal to that in the second wafer 10B. That is to say, the first wafer 10A in the second lamp heating system 22 hardly transmits light emitted from the lamps, and hence has its real temperature increased to the same extent as that of the second wafer 10B. Thus, the second lamp heating system 22 is not affected by the structure of a wafer.

In this manner, whether or not a temperature indicated by a thermometer provided in a lamp heating system is affected by the structure of a wafer can be determined.

In addition, if this evaluation is applied to a system such as the first lamp heating system 21 that is affected by the structure of a wafer, the second wafer 10B having a constant transmittance to light emitted from the lamps is effective in predicting the actual wafer temperature accurately.

On the other hand, to predict the actual wafer temperature in a system such as the second lamp heating system 22 that is not affected by the structure of a wafer, either of the first and second wafer 10A and 10B may be used. However, with respect to the cost of fabricating a test wafer, the first wafer 10A having no light absorption film is preferably used.

In the second embodiment, a recovery rate at which part of the second semiconductor layer 11b recovers to a crystalline layer is not calculated. This is because it is sufficient to determine whether or not a lamp heating system itself is affected by the structure of a wafer, even without predicting the actual wafer temperature by calculating the recovery rate.

What is claimed is:

1. A method for predicting, using a test wafer, a temperature of a wafer to be loaded into a lamp heating system including a lamp, the method comprising the steps of:

a) preparing the test wafer, which includes a first semiconductor layer formed in a crystalline state, a second semiconductor layer formed in an amorphous state on the first semiconductor layer, and a light absorption film formed over the second semiconductor layer;

b) loading the test wafer into the lamp heating system and then irradiating the test wafer with a light emitted from the lamp, thereby heating the second semiconductor layer through the light absorption film;

c) calculating a recovery rate of the second semiconductor layer from the amorphous state to the crystalline state at which a part of the second semiconductor layer that has been heated recovers from the amorphous state to the crystalline state at the interface with the first semiconductor layer; and d) measuring a temperature of the test wafer that has been irradiated with the light, according to a relationship between the recovery rate and a temperature corresponding to the recovery rate.

2. The method of claim 1, wherein at least a part of the light has a wavelength at which the first semiconductor layer transmits the light.

3. The method of claim 2, wherein the light has a wavelength at which the first semiconductor layer has a transmittance to the light, the transmittance increasing within a temperature range.

4. The method of claim 1, wherein the light has a wavelength from about 1.0 µm to about 3.0 µm, both inclusive.

5. The method of claim 3, wherein the temperature range is from about 450° C. to about 600° C., both inclusive.

6. The method of claim 1, wherein the test wafer has a diameter of about 30.5 cm or more.

* * * * *